Dec. 10, 1929.  J. BERGE  1,738,632
DIRIGIBLE LIGHT AND MOUNTING THEREFOR
Filed May 16, 1925   2 Sheets-Sheet 1
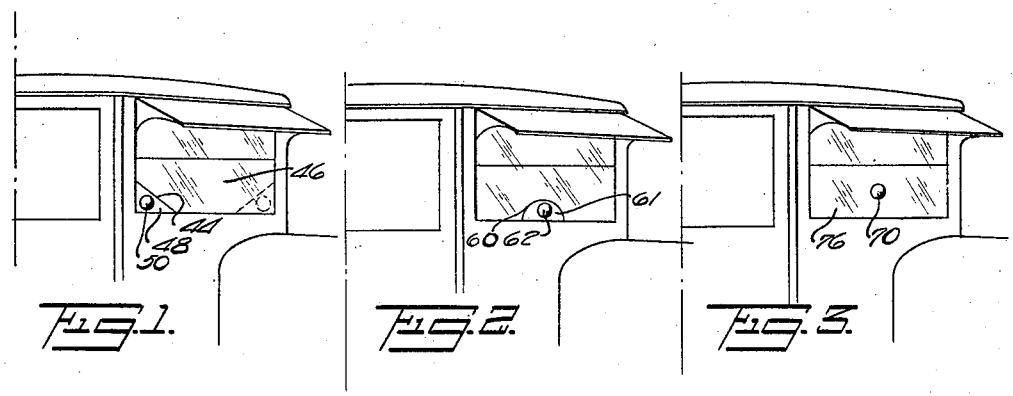
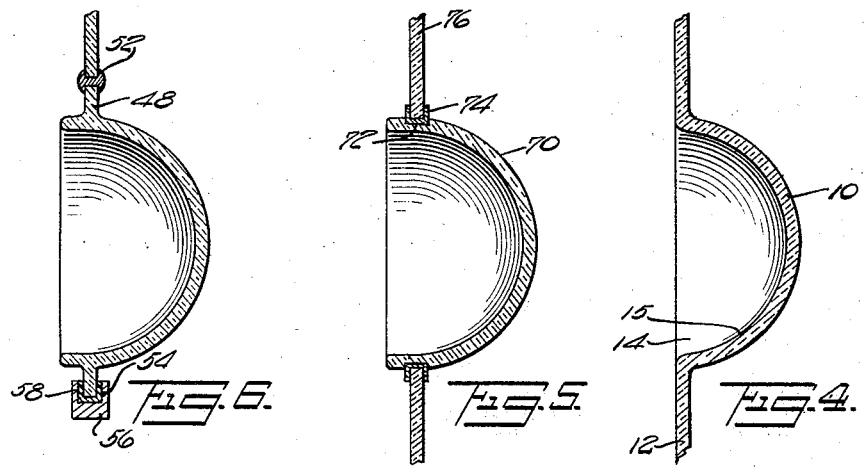
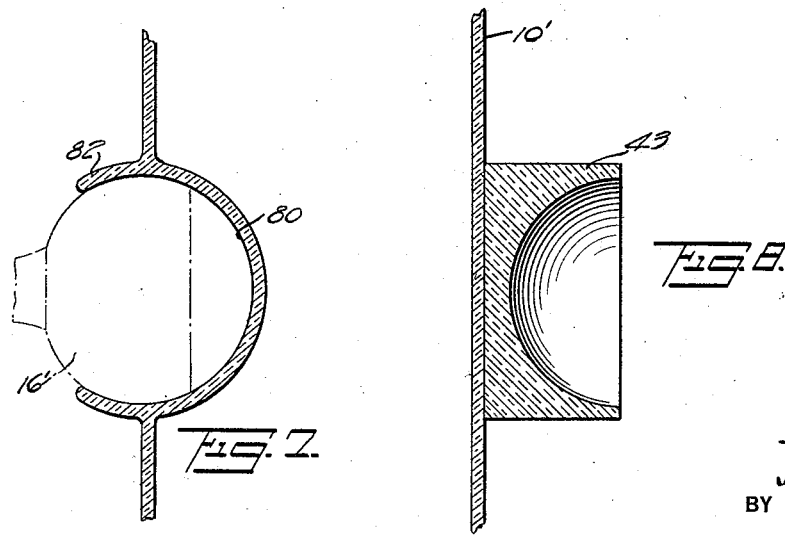
INVENTOR
J. Berge
BY H. H. Dyke
ATTORNEY

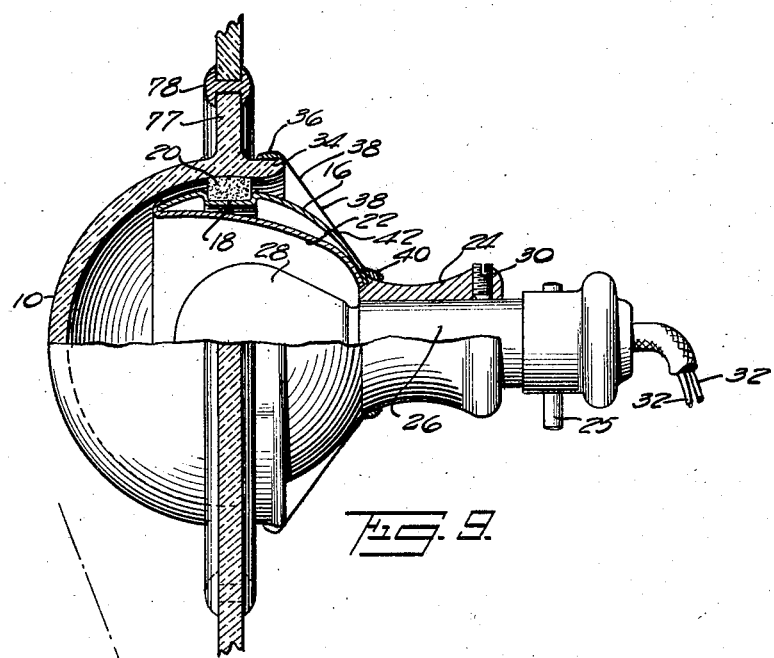
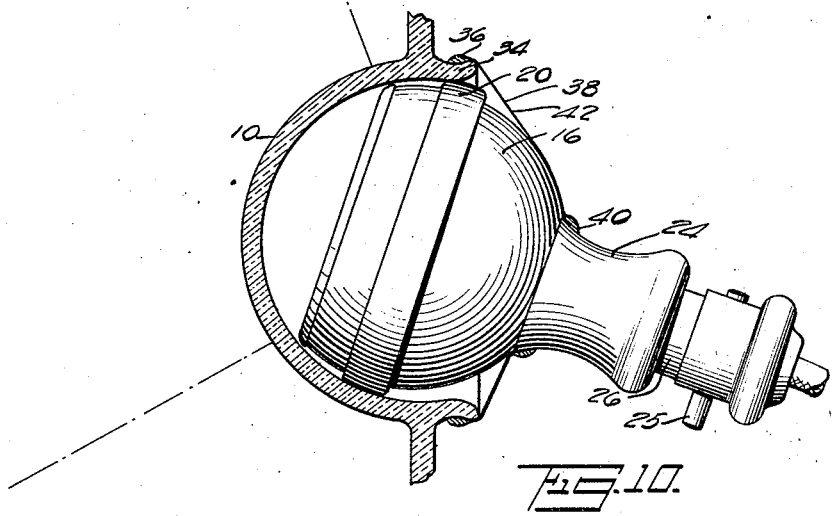

Patented Dec. 10, 1929

1,738,632

UNITED STATES PATENT OFFICE

JOSEPH BERGE, OF MONTCLAIR, NEW JERSEY

DIRIGIBLE LIGHT AND MOUNTING THEREFOR

Application filed May 16, 1925. Serial No. 30,841.

My invention relates to a dirigible light and a socket or orbital mounting therefor in a transparent pane, wall or the like of an enclosure where it is desirable to manipulate or aim a light from one side of a pane and direct its rays out the other side, as in an enclosed vehicle body, boat, airplane, building, etc.

According to my invention, an inwardly opening, preferably substantially hemispherical transparent socket is provided in material of the pane, or of an insert therein or supplement thereto or complement thereof, and the lamp is universally journaled in such socket or orbit so that it is altogether on the inside of the pane and so is protected or sheltered by the pane and projects its beams therethrough in any desired direction, and is preferably removable from or, as I prefer to express it, transient in such mounting so that it can be readily taken out and given any cleaning or other required attention or used within the car body or other structure or directed upon objects outside of the range of its orbital mounting.

In the accompanying drawings I have shown embodiments of my invention in order to afford an understanding thereof and an illustration of some of the numerous forms in which it may be utilized.

In said drawings, Figs. 1, 2 and 3 are perspective views showing respectively corner, edge and central mountings of a light in the glass windshield of an automobile. Fig. 4 is a section of a pane having a substantially hemispherical lamp cup or socket formed as an integral part thereof and adapted to cause the least possible interference with vision. Fig. 5 is a section of a cup or socket member inserted in a hole through a pane. Fig. 6 is a section of a cup or lamp socket member in a partial corner pane. Fig. 7 is a section of a cup providing a part spherical pocket greater than a hemisphere and with a lamp shell of material similar to a tennis ball. Fig. 8 is a section of a cupped lamp socket member of transparent material secured to the inside of an ordinary flat pane. Fig. 9 is a part sectional detail view on an enlarged scale of a lamp in its mounting, and Fig. 10 is a view generally similar to Fig. 9 and showing the dirigible lamp manually tilted.

The part spherical transparent cup or socket 10 may be formed as an integral portion of a pane 12, as shown in Fig. 4, or of a partial pane substituted for a removed or cut away part of the principal pane, as shown in Figs. 1, 2 and 3. The pane may be of any material permitting passage of light. In the case of a pane of glass the cup may be produced in the hot glass, as by molding or pressing. The convex side of cup 10 is directed outwardly and the opening 14 and orbit 15 therein are on the inside of the pane so that a lamp inserted in the socket 10 from the inside of the pane is completely protected from the elements by the socket wall.

The lamp preferably comprises a part spherical shell 16 having a preferably equatorial belt of compressible elastic material adapted to make frictional contact with the socket. For example, shell 16 may be provided with an equatorial groove 18 in which is received the belt 20 of felt, veloured rubber or the like, which preferably extends beyond the surface of shell 16 and has a normal outside dimension somewhat in excess of the inner corresponding dimension of cup or socket 10 so that when shell 16 is inserted or pushed in socket 10 it is frictionally held therein by belt 20 being somewhat compressed.

A reflector 22 may be provided within shell 16 and they may be crimped together onto a handle or socket holder 24, which can be made of insulating material, or, if of metal, can be suitably insulated. In handle 24 is slidably received the lamp socket 26 which receives the lamp bulb 28. Socket 26 may be adjusted and secured by set screw 30 to focus the filament in bulb 28 with relation to the reflector 22.

Any convenient switch as 25 may be provided to control the current supplied through current leads 32, 32.

The belt 20, in addition to providing a flexible and dirigible mounting for the lamp in its socket, also serves to exclude dust and foreign materials and keep them away from the lamp and reflector interior. Being behind the glass or other transparent material of cup 10, the lamp does not need a lens, but may be provided with one, if desired, and same is useful for protecting the bulb when the lamp is withdrawn from its socket and used as a portable or trouble lamp, which may be done if desired, the socket mounting making a convenient receiver for a lamp so used, in addition to enabling it to serve as a housed-in spotlight.

The cup may be extended inwardly beyond the pane as shown at 34 in Figs. 9 and 10 and the annular flange thus provided may receive the encircling reenforced outer edge 36 of an elastic sleeve 38, as of rubber or the like having a similarly thickened or edge reenforced opening 40 therein to encircle and clasp the handle 24. The elastic preferably thin web portion 42 of sleeve 38 connecting the reenforced marginal parts 36 and 40 may be stretched more or less in applying the sleeve 38 so that said sleeve serves to bring the lamp back to a predetermined aim or axial direction when released, and yet yields or stretches readily to permit the lamp being manually pointed in any desired direction, as indicated in Fig. 10. This is of advantage, as, for example, where state laws require that automobile spotlights shall not be lighted or used unless directed in a specified relation to the road. When the preferably live rubber cap or sleeve 38 is used the exclusion of dust, etc., is even more complete than with only the belt 20. When the lamp is removed from its socket, sleeve 38 may be temporarily sprung off the flange 34, and restretched thereon when the lamp is returned to its socket.

The transparent socket may be provided in other ways than by forming directly in the pane or panel in which it is located. In Fig. 8 I have shown a separate lamp socket piece 43 of glass or the like secured as by transparent cement to the interior of the pane 10'.

In Fig. 1 I have shown the corner 44 of windshield glass pane 46 cut off and replaced by a triangular partial pane 48 in which the socket 50 is formed. This may be done at any one or more of the corners, as will be readily understood. The partial pane 48 is joined to the cut off edge of windshield 46 by a double grooved preferably rubber grommet 52. As the base and altitude sides or edges of the triangular complemental pane portion 48 simply take the place of the corresponding parts of the original windshield glass sides or edges, same may be seated in the groove 54 of windshield frame 56 with the ordinary grooved gasket 58 of rubber or the like interposed. In this way the complemental pane portion 48 containing the socket member is connected to the frame and cut away pane margin and the whole assembly is completely weather tight.

In Fig. 2 I have shown a semicircular cut out 60 in a side or edge portion of the pane, which is replaced by the semicircular partial pane portion 61 with a lamp socket 62 therein. The grommet and gasket arrangement may be similar to that used when the corners are cut off and replaced as shown in Fig. 6.

While pane portions 48 and 61 are shown as complemental portions replacing parts cut out of the pane, it will be appreciated that substantially the same result can be secured by providing the socket in supplemental or additional partial pane portions without cutting away or removal of any part of the original pane.

While it is preferable in making cut outs to be replaced by socket containing transparent members that the cuts be made on the sides or corners of the pane, particularly in the case of glass panes, because of the greater facility with which corners can be cut off or edges or sides cut away, the socket containing member may be made to fit in a hole in the pane remote from its edges or corners. I have shown such construction in Figs. 3, 5 and 9, and in the case of Fig. 5, in order to prevent interference with free vision I have shown the socket member without any surrounding partial pane portion and comprising merely a hollow transparent partly spherical member 70 with a groove 72 in its outer wall to receive the grommet or gasket 74 of rubber or other deformable elastic weathertight material, which joins it to the edges of the hole in the windshield 76. The insert member replacing the material removed to form an opening in the pane may, however, comprise a socket member welded or otherwise formed in a partial pane, as, for example, in Fig. 9 the socket member is surrounded by the flat or plane extension 77, thus producing a socketed disc which is secured within and to the edges of the opening in the original pane by the double grooved, preferably rubber, gasket 78.

While a hemispherical socket or hemispherical socket with cylindrical extension is a sufficient socket and is preferable because of being simple and inexpensive to make, I may, if desired, make a part spherical socket greater than a hemisphere as shown at 80, Fig. 7, with a flange 82 on the inside of the pane or partial pane, and, in such case, I can make use of the metallic spherical lamp shell 16 with the compressible elastic belt 20 having sufficient compressibility to be pushed into place, but preferably in such case I provide instead the shell 16' shown in Fig. 7 and which is of resilient collapsible material like the shell of a tennis ball, for example. Such a shell has extensive frictional contact with the orbit and will remain and hold the lamp in any position in which it may be left.

It will be seen that a lamp constructed and mounted in accordance with my invention has many features of advantage including, among others, reduced interference with vision and extended range of dirigibility, that the pane protects the lamp insuring long life and freedom from deterioration by the elements and that these and related desirable results are secured in a simple and inexpensive way.

The embodiments shown for illustration are not to impose limits on the invention, which is of the scope defined in my claims by which I intend to cover all that is novel in view of the prior art.

I claim:

1. The combination with a pane having a diaphanous socket portion thereon, of a lamp fitting within and dirigibly and transiently mounted in said socket portion and transmitting light therethrough.

2. A pane having a substantially hemispherical diaphanous lamp socket opening on its inner side, and a lamp fitting within and dirigibly and transiently mounted in said socket and transmitting light through the wall thereof.

3. An enclosure wall, a cup-shaped insert member of transparent material in said wall, said insert member providing a lamp mounting, and a lamp removably mounted for dirigible movement in said cupped mounting and sheltered thereby from exposure and transmitting light through the transparent cup wherein it is mounted.

4. A device of the character described comprising a member having a diaphanous forward wall portion and a recess open at the rear thereof, and constituting a bearing, a light emitting member received within the open end of said member, and supported thereby for universal movement, and elastic means connecting said members for returning the light emitting member to normal position upon the release thereof.

5. In combination with a vehicle window pane having a complementary transparent cupped substantially hemispherical recess, said recess intersecting the plane of the pane with an opening surounded by a circular ledge, a lamp journaled for universal movement in said recess, said lamp having a contact portion which is resiliently compressible, and an elastic boot stretched around said ledge and serving for directionally positioning said lamp in said recess.

6. A lamp, a universal mounting therefor, and an elastic boot engaging the lamp and the mounting and serving to seal the same at the joint thereof, and to return said lamp to normal position.

7. A pane having a cut away part, a partial pane water-tight grommeted about the edges of the cutaway part, said partial pane having a hollow substantially hemispherical socket formed in the material thereof and producing a convex bulge on its outer surface and also having a flange on its inner side forming an extension of the socket and opening on the inner side of the partial pane, a substantially spherical lamp shell frictionally, universally and removably journaled in said socket, a handle for said lamp projecting out of the opening in the flange, and a rubber boot having a central hole therein for receiving said handle and the margin of said boot stretched over said flange.

8. The combination with a motor vehicle windshield of diaphanous material, of a portion of like material thereon having a recess at the rear thereof forming a bearing, and a light emitting device received within said bearing and supported thereby for universal movement, and serving to transmit light through the diaphanous wall portions of said recess.

9. The combination with a window pane, of a diaphanous portion thereon having a socket bearing open at the rear, a light emitting device including a reflecting element received within the open end of said socket bearing and coacting therewith to form a universal joint, and serving to direct the light through the diaphanous wall portion of said socket bearing, a ring of yieldable material disposed intermediate of said socket bearing and said reflecting element to provide a closed joint therebetween in the various positions of said element, and an elastic boot connecting said diaphanous portion and said light emitting device to provide a seal at the rear thereof, and to return said light emitting device to normal position.

10. An incomplete diaphanous pane, a supplemental partial diaphanous pane completing the same and being of socket formation opening at the inner side, and a lamp dirigibly mounted within the socket and transmitting light through the diaphanous wall thereof.

11. A vehicle window pane having a diaphanous portion of semi-spherical formation, and a lamp dirigibly supported by said semi-spherical portion and transmitting light through the diaphanous wall thereof.

12. The combination of a diaphanous portion constituting an incomplete pane, with a diaphanous portion fitted to said first portion to complete said pane, said last named diaphanous portion being of semi-spherical formation, and a lamp dirigibly supported by the semi-spherical formation and transmitting light through the diaphanous wall thereof.

13. A window pane having a transparent portion recessed at the rear thereof, and a lamp received within and movably supported by said recess and transmitting light through the diaphanous front wall of said recessed portion.

14. An enclosure wall having a transparent concavo-convex portion therein forming a socket, said portion having the concave side thereof at the rear and the convex side thereof at the front, and a lamp received within and dirigibly supported by said portion at the rear thereof to be protected thereby and transmitting light through the transparent front wall thereof.

In testimony whereof, I have signed my name hereto.

JOSEPH BERGE.